(12) United States Patent
Jiang et al.

(10) Patent No.: US 11,663,417 B2
(45) Date of Patent: May 30, 2023

(54) DATA PROCESSING METHOD, ELECTRONIC DEVICE, AND STORAGE MEDIUM

(71) Applicant: EAST CHINA JIAOTONG UNIVERSITY, Nanchang (CN)

(72) Inventors: Nan Jiang, Nanchang (CN); Jin Li, Guangzhou (CN); Wei Huang, Nanchang (CN); Honglong Chen, Qingdao (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 342 days.

(21) Appl. No.: 17/161,699

(22) Filed: Jan. 29, 2021

(65) Prior Publication Data
US 2021/0390261 A1    Dec. 16, 2021

(30) Foreign Application Priority Data
Jun. 11, 2020  (CN) .......................... 2020105320073

(51) Int. Cl.
*G06F 17/00*    (2019.01)
*G06F 40/30*    (2020.01)
(52) U.S. Cl.
CPC .................... *G06F 40/30* (2020.01)

(58) Field of Classification Search
None
See application file for complete search history.

(56) References Cited

U.S. PATENT DOCUMENTS

| | | | |
|---|---|---|---|
| 11,194,972 B1* | 12/2021 | Tao | G06N 3/08 |
| 2020/0365134 A1* | 11/2020 | Tu | G10L 15/04 |
| 2022/0043975 A1* | 2/2022 | Li | G06N 3/049 |
| 2022/0171936 A1* | 6/2022 | Wang | G06F 40/289 |

FOREIGN PATENT DOCUMENTS

| | | | | |
|---|---|---|---|---|
| CA | 3089001 A1 * | 2/2021 | | G06F 40/211 |
| EP | 3767516 A1 * | 1/2021 | | G06F 40/284 |

* cited by examiner

*Primary Examiner* — Satwant K Singh (57) ABSTRACT

Provided are a data processing method, an electronic device and a storage medium. The method include: acquiring pending word vectors; acquiring multi-head attention vectors based on the pending word vectors, the multi-head attention vectors including first and second multi-head attention vectors; acquiring, based on the first multi-head attention vector, a first hidden semantic representation corresponding to the sentence; acquiring, based on the second multi-head attention vector, a second hidden semantic representation corresponding to the target word; acquiring a classification feature vector, based on the first and second hidden semantic representations; and acquiring, based on the classification feature vector, a sentiment polarity category of the sentence, and performing a sentiment classification on the sentence.

20 Claims, 3 Drawing Sheets

DATA PROCESSING METHOD, ELECTRONIC DEVICE, AND STORAGE MEDIUM

CROSS-REFERENCE TO RELATED APPLICATION

This disclosure claims priority to Chinese patent application No. 202010532007.3 filed on Jun. 11, 2020. The contents of the aforementioned application are incorporated herein by reference.

TECHNICAL FIELD

The disclosure relates to the technical field of natural language processing technical field, and particularly to a data processing method, a data processing apparatus, an electronic device and a storage medium.

BACKGROUND

With the rapid development and widespread use of Internet technology, more and more users tend to express opinions, express emotions or state views on the Internet. Sentiment analysis, also known as opinion mining, belongs to a research field of analyzing people's subjective perceptions such as opinions, emotions, evaluations, views and attitudes, on entity objects such as products, services, organizations, individuals, events, topics and attributes thereof. The sentiment analysis may be utilized to mine user's opinions, emotions, views or the like. The sentiment analysis can be performed to help users obtain contents of interest from massive textual information efficiently, accurately, and comprehensively. However, in the related art, when the sentiment analysis is performed on texts involving multiple sentiments or aspects, the discrimination between different sentiment polarities in a text and the accuracy of sentiment classification all need to be improved.

SUMMARY

In view of the above, embodiments of the disclosure provide a data processing method and apparatus, an electronic device and a storage medium.

An embodiment of the present disclosure provides a data processing method. The method includes: acquiring pending word vectors, where the pending word vectors include word vectors and reference word vectors, the word vectors respectively correspond to a sentence and a target word, and the reference word vectors respectively correspond to the sentence and the target word; acquiring multi-head attention vectors based on the pending word vectors, where the multi-head attention vectors include a first multi-head attention vector and a second multi-head attention vector, the first multi-head attention vector represents a multi-head attention vector representation of the sentence to the target word, and the second multi-head attention vector represents a multi-head attention vector representation of the target word to the sentence; acquiring, based on the first multi-head attention vector, a first hidden semantic representation corresponding to the sentence, and acquiring, based on the second multi-head attention vector, a second hidden semantic representation corresponding to the target word; acquiring a classification feature vector, based on the first and the second hidden semantic representations; and acquiring, based on the classification feature vector, a sentiment polarity category of the sentence, thereby performing a sentiment classification on the sentence.

An embodiment of the present disclosure provides a data processing apparatus. The data processing apparatus includes: a word vectors acquiring module, configured to acquire pending word vectors, where the pending word vectors include word vectors and reference word vectors, the word vectors respectively correspond to a sentence and a target word, and the reference word vectors respectively correspond to the sentence and the target word; a multi-head attention vectors acquiring module, configured to acquire multi-head attention vectors based on the pending word vectors, where the multi-head attention vectors include a first multi-head attention vector and a second multi-head attention vector, the first multi-head attention vector represents a multi-head attention vector representation of the sentence to the target word, and the second multi-head attention vector represents a multi-head attention vector representation of the target word to the sentence; a hidden semantic representations acquiring module, configured to acquire, based on the first multi-head attention vector, a first hidden semantic representation corresponding to the sentence, and acquire, based on the second multi-head attention vector, a second hidden semantic representation corresponding to the target word; a classification feature vector acquiring module, configured to acquire a classification feature vector, based on the first and the second hidden semantic representations; and a sentiment polarity category acquiring module, configured to acquire, based on the classification feature vector, a sentiment polarity category of the sentence and perform a sentiment classification on the sentence.

An embodiment of the present disclosure provides an electronic device. The electronic device includes a memory and one or more processors, where one or more programs are stored in the memory and configured to be executed by the one or more processors, cause the one or more processors to perform steps including: acquiring pending word vectors, based on a sentence including a target word; acquiring multi-head attention vectors, based on the pending word vectors; acquiring hidden semantic representations, based on the multi-head attention vectors; acquiring a classification feature vector, based on the hidden semantic representations; and acquiring, based on the classification feature vector, a sentiment polarity category of the sentence, thereby performing a sentiment classification on the sentence.

An embodiment of the present disclosure provides a computer readable storage medium, where the computer readable storage medium stores program codes therein, the program codes, when being executed by a processor, cause the processor to implement steps including: acquiring pending word vectors, based on a sentence including a target word; acquiring, based on the pending word vectors, multi-head attention vectors respectively correspond to the sentence and the target word; acquiring, based on the multi-head attention vectors, hidden semantic representations respectively correspond to the sentence and the target word; acquiring a classification feature vector, based on the hidden semantic representations; and acquiring, based on the classification feature vector, a sentiment polarity category of the sentence, thereby performing a sentiment classification on the sentence.

BRIEF DESCRIPTION OF THE DRAWINGS

In order to more clearly illustrate technical solutions in the embodiments of the present disclosure, drawings to be used in the descriptions of the embodiments are briefly described below. Obviously, the following drawings are just some embodiments of the disclosure, and other drawings can also be obtained by those skilled in the art according to these drawings without any creative effort.

DETAILED DESCRIPTION OF PREFERRED EMBODIMENTS

The technical solutions in the embodiments of the disclosure will be clearly and completely described in the following with reference to the drawings of the embodiments, in order to enable those skilled in the art to better understand the disclosure.

Sentiment analysis is a fundamental task of processing natural language. The sentiment analysis can be used to mine users' opinions, and carry out tasks such as data analysis and public opinion monitoring. The sentiment analysis may particularly include extraction of sentiment information, classification of sentiment information, as well as retrieval and summarization of sentiment information.

The sentiment classification may classify texts into two types, such as positive or derogatory, or into multiple types, according to meanings and sentiment information expressed by the texts. The sentiment classification means performing classification on tendencies, sentiments, and attitudes of the text author. The sentiment classification includes three different levels, namely, a document level, a sentence level and an aspect level. The document-level sentiment classification classifies a document with a strong sentiment (e.g., a product review) as being positive or negative on a whole. The document-level sentiment classification considers the whole document as a basic information unit, and assumes that the document presents a strong sentiment, including a sentiment about a single entity (e.g., a certain model of phone). The sentence-level sentiment classification classifies an individual sentence in a document. However, an individual sentence cannot be assumed to present a strong sentiment. Compared with the document-level and sentence-level sentiment classifications, the aspect-level sentiment classification is more fine-grained. A task of the aspect-level sentiment classification is to extract and summarize people's sentiments about an entity as well as a feature of the entity (which is also known as a target or an aspect term). For example, as for a review on a product, the aspect-level sentiment classification aims to summarize the positive and negative sentiments of different aspects of the product. In a case where a sentence includes multiple aspect terms, a specific model is needed to analyze sentiment polarities of the different aspect terms. This is different from a traditional sentiment classification model. For example, in a sentence as a comment "the food in the restaurant tastes good, but the waiter's service attitude was poor", there are two aspect terms of "taste" and "service attitude", where a sentiment polarity of "taste" is positive, and a sentiment polarity of "service attitude" is negative. The sentiment polarity of the whole sentence in the example includes both the positive and negative polarities. It is difficult to determine the sentiment polarity of this sentence without considering information of the aspect terms. Such error commonly exists in the general sentiment classification tasks.

In the related art, the sentiment classification is commonly based on an attention-over-attention (AOA) model which applies a dual attention mechanism. Specific processing steps thereof are as follows.

In a first step, hidden state matrixes are multiplied to obtain a matrix I, where the hidden state matrixes are obtained by making a word vector of a sentence and a word vector of target word subject to processing of a Bi-directional Long Short-Term Memory (BiLSTM) network. The matrix I is calculated according to a formula as follows.

$$I = h_s \cdot h_t^T$$

In a second step, two attention matrixes, $\alpha_{ij}$ and $\beta_{ij}$, are calculated using a softmax function:

$$\alpha_{ij} = \frac{\exp(I_{ij})}{\Sigma_i \exp(I_{ij})}$$

$$\beta_{ij} = \frac{\exp(I_{ij})}{\Sigma_j \exp(I_{ij})}$$

In a third step, a target word-level attention vector $\bar{\beta}$ is obtained by performing an average operation on the attention matrix $\beta_{ij}$:

$$\bar{\beta} = \frac{\Sigma_i \beta_{ij}}{n}$$

In a fourth step, the attention matrix $\alpha_{ij}$ and the attention vector $\bar{\beta}$ are multiplied to obtain a final sentence-level attention vector $\gamma$:

$$\gamma = \alpha \cdot \bar{\beta}^T$$

In a fifth step, the hidden state matrix of the sentence and the final sentence-level attention vector $\gamma$ are multiplied to obtain a final sentence representation r:

$$r = h_s^T \cdot \gamma$$

In a sixth step, the final sentence representation r is fed into a linear function, and a classification is performed by using the softmax function:

$$x = W_l \cdot r + b_l$$

$$P(y = c) = \frac{\exp(x_c)}{\Sigma_{i \in C} \exp(x_i)}$$

where $W_l$ represents a weight matrix, $b_l$ represents a bias, and C represents a class of multiple sentiment polarity categories.

However, the above method ignores the interdependence between the sentence and the sentence and the aspect term(s), and has to make improvements in terms of discrimination between sentiment polarities of different aspects in a sentence and the accuracy of the sentiment classification. In addition, the model is unable to generate vector representations, which respectively correspond to the sentence and the target word and incorporate semantic information of the whole sentence.

In order to alleviate the above problems, the embodiments of the present disclosure provide a data processing method, a data processing apparatus, an electronic device and a storage medium. The data processing method in the embodiments of the present disclosure can be applied to the scenarios of analyzing the reviews on a product or service or the like. In the method, pending word vectors are acquired, and multi-head attention vectors are acquired based on the pending word vectors. The multi-head attention vectors include a first multi-head attention vector and a second multi-head attention vector. The first multi-head attention vector represents a multi-head attention vector representation of the sentence to the target word. The second multi-head attention vector represents a multi-head attention vector representation of the target word to the sentence. Based on the first multi-head attention vector, a first hidden semantic representation corresponding to the sentence is acquired. Based on the second multi-head attention vector, a second hidden semantic representation corresponding to the target word is acquired. Then, a classification feature vector is acquired, based on the first and the second hidden semantic representations. Afterwards, a sentiment polarity category of the sentence is acquired based on the classification feature vector, and a sentiment classification is performed on the sentence. In the embodiments, by acquiring the multi-head attention vectors based on the pending word vectors, vector representations corresponding to the sentence and the target word are acquired, which vector representations incorporate semantic information of the sentence. Thus, the classification result based on the classification feature vector can be more accurate, and the accuracy of the sentiment classification can be improved.

The embodiments of the present disclosure will be described in detail hereafter with reference to the drawings.

Figure 1:
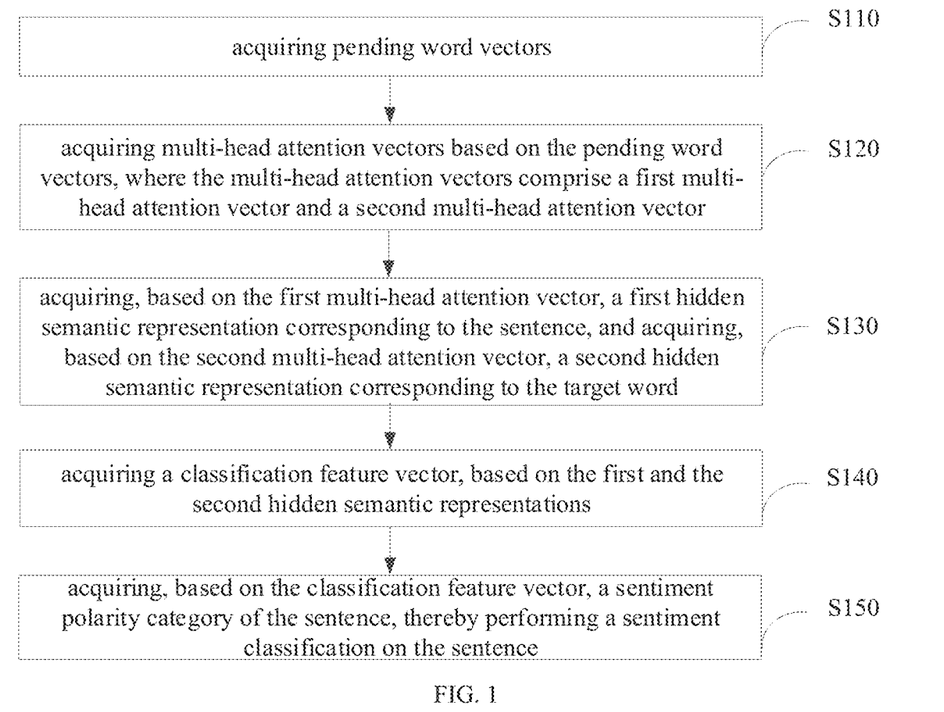
FIG. 1 is a flowchart of a data processing method according to an embodiment of the present disclosure.

Referring to FIG. 1, a flowchart of a data processing method according to an embodiment of the present disclosure is illustrated. The data processing method provided by the embodiment may be applied to an electronic device. The electronic device may be a device capable of running a program thereon, such as a smart phone, a tablet computer, a computer, a wearable electronic device, or a server.

In step S110, pending word vectors are acquired.

The pending word vectors in the embodiment may include word vectors and reference word vectors. The word vectors respectively correspond to a sentence and a target word, and the reference word vectors respectively correspond to the sentence and the target word. The word vector corresponding to the sentence may be represented by $e_S$, and the word vector corresponding to the target word may be represented by $e_T$. The word vector and the reference word vectors respectively corresponding to the sentence and the target word may be understood as vector representations which correspond to the input sentence and target word respectively and incorporate semantic information of the sentence. The reference word vector corresponding to the sentence may be represented by $\bar{e}_S$, and the reference word vector corresponding to the target word may be represented by $\bar{e}_T$.

In an implementation, the pending word vectors may be specifically acquired as follows.

Figure 2:
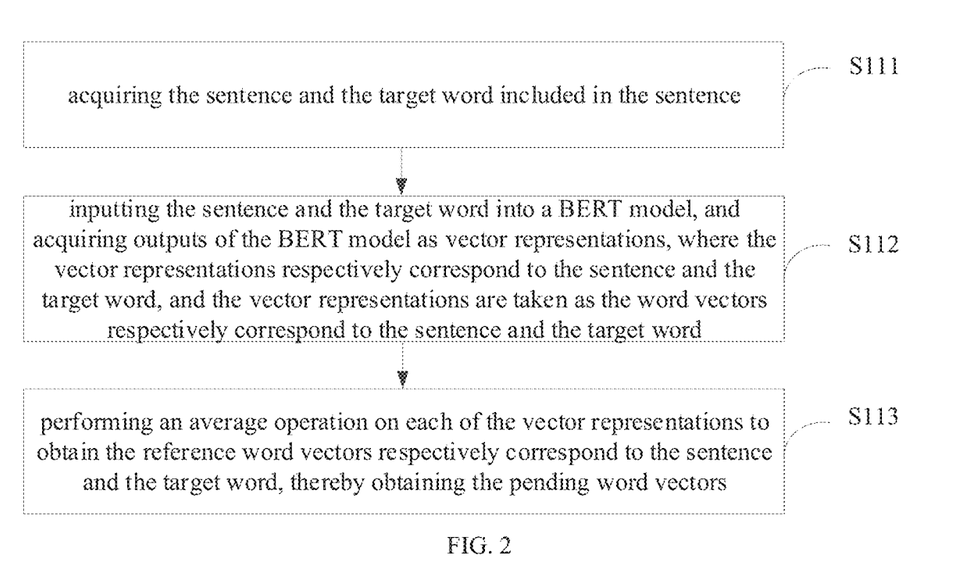
FIG. 2 is a flowchart illustrating sub-steps of S110 shown in FIG. 1.

Referring to FIG. 2, in an implementation, the step S110 may include Step S111, Step S112 and Step S113.

In Step S11, the sentence and the target word included in the sentence are acquired.

The sentence may be a sentence of length m and represented as $s=[w_1, w_2, \ldots, w_i, \ldots, w_m]$ (where w represents a phrase or a word in the sentence of length m, and the digits "1, 2, ..., m" may represents the number of the corresponding phrase or word in the sentence). The acquired sentence may be a sentence of length n and represented as $t=[w_i, w_{i+1}, \ldots, w_{i+n-1}]$, where w represents a phrase or a word in the sentence of length m, and the digits "i, i+1, ..., i+n-1" may represents the number of the corresponding phrase or word in the sentence). It should be noted that the sentence includes the target word, that is, the target word is originated from the sentence, in the present embodiment. For example, the target word may be a phrase extracted from the sentence.

In an implementation, the target word may be a phrase in the sentence whose part of speech is noun. Specifically, the target word in the present embodiment may be an aspect term. For example, in the sentence "the food in the restaurant tastes good, but the waiter's service attitude was poor", the aspect terms may include "taste" and "service attitude", and the target word may be "taste" and "service attitude".

In an implementation, the acquired sentence may be manually annotated, that is, all words in the acquired sentence are annotated. In this manner, aspect terms may be extracted from the acquired sentence based on a model for extracting feature words. The model for extracting feature words can be trained based on a Stanford CoreNLP dataset. The Stanford CoreNLP is a toolset for natural language processing (NLP), which integrates a number of tools including a part of speech tagger, and contains text data having the part of speech of each word tagged. The trained model for extracting feature words may be used to extract one or more aspect terms from the sentence, and thus the target word is acquired.

In step S112, the sentence and the target word are input into a bidirectional encoder representations from transformers (BERT) model, and outputs of the BERT model are obtained as vector representations respectively corresponding to the sentence and the target word.

The BERT model is obtained by pre-training. In an implementation, the vector representations respectively correspond to the sentence and the target word, and the vector representations incorporate semantic information of the sentence.

In an implementation, after the sentence and the target word are acquired, the sentence and the target word may be input into a BERT model. The outputs of the BERT model may be acquired as vector representations respectively corresponding to the sentence and the target word. Specifically, the sentence $s=[w_1, w_2, \ldots, w_i, \ldots, w_m]$ is input into the BERT model, and the vector representation corresponding to the sentence is obtained, which is represented by $e^S=[e_S^1; e_S^2; \ldots; e_S^i; \ldots; e_S^m]$. The target word $t=[w_i, w_{i+1}, \ldots, w_{i+n-1}]$ is input into the BERT model, and the vector representation corresponding to the target word is obtained, which is represented by $e^T=[e_T^i; e_T^{i+1}; \ldots; e_T^{i+n-1}]$.

In step S113, an average operation is performed on each of the vector representations, thereby the pending word vectors are obtained.

In an implementation, after the vector representations respectively correspond to the sentence and the target word are acquired based on the BERT model, an average operation may be performed on each of the vector representations, thereby obtaining the pending word vectors. The average operation may be performed on the vector representation corresponding to the sentence represented by $e^S=[e_S^1; e_S^2; \ldots; e_S^i; \ldots; e_S^m]$, to obtain:

$$v_S = \sum_{i=1}^{m} \frac{e_S^i}{m}$$

The average operation may be performed on the vector representation corresponding to the target word, which is represented by $e^T=[e_T^i; e_T^{i+1}; \ldots; e_T^{i+n-1}]$, to obtain:

$$v_T = \sum_{i=1}^{n} \frac{e_T^i}{n}$$

The acquired vector representations corresponding to the sentence and the target word respectively may be taken as the pending word vectors. In particular, the vector representation $e^S$ is taken as the word vector correspond to the sentence, the vector representation $e^T$ is taken as the word vector correspond to the target word; and $\bar{e}_S$ is taken as the reference word vector correspond to the sentence, and $\bar{e}_T$ is taken as the word vector correspond to the target word.

In step S120, multi-head attention vectors are acquired based on the pending word vectors, where the multi-head attention vectors include a first multi-head attention vector and a second multi-head attention vector.

In an implementation, the pending word vectors may be input into a multi-headed attention (MHA) layer of a target neural network, and outputs of the MHA layer are taken as multi-head attention vectors. The multi-head attention vectors may include a first multi-head attention vector and a second multi-head attention vector. The first multi-head attention vector represents a multi-head attention vector representation of the sentence to the target word, and the second multi-head attention vector represents a multi-head attention vector representation of the target word to the sentence.

The target neural network is a sentiment classification neural network model based on a joint attention mechanism. In an implementation, the target neural network may include a MHA layer and a convolution layer. And the working principle of the MHA layer is described as follows.

Assuming that there is a key-value represented by source=<key,value> and a set of queries represented by query. A similarity between the key and the query is calculated for each query. A query vector may be defined as $q=[q_1, q_2, \ldots, q_u]$, and a key vector may be defined as $k=[k_1, k_2, \ldots k_v]$, and a similarity may be calculated according to a formula as follows.

$$f_s(k,q)=\tanh([k_i;q_j]\cdot W_a),$$

where $i=1, 2, \ldots, u$; and $j=1, 2, \ldots, v$.

$W_a$ in the above formula may represent a weight matrix.

The similarity may then be input into a softmax function, and a summation operation may be performed on outputs of the softmax function to obtain the attention value Attention(k,q):

$$\text{Attention}(k, q) = \sum_{1}^{n} \text{softmax}(f_s(k, q))k$$

Parallel calculation may be performed on the input information with multiple heads of attention, according to formulas as follows:

$$\text{head}_i=\text{Attention}(k,q)$$

$$\text{MHA}(k,q)=(\text{head}_1;\text{head}_2; \ldots ;\text{head}_h)\cdot W_o$$

In the above formulas, $\text{head}_i$ represents the i-th head attention, and $W_o$ represents a weight matrix.

Based on the above description, in an implementation, the word vector corresponding to the sentence and the reference word vector corresponding to the target word are input into a MHA function, i.e., $e_s$ and $\bar{e}_T$ are input into a function $\text{MHA}(k,q)=(\text{head}_1; \text{head}_2; \ldots; \text{head}_h)\cdot W_o$, thereby outputting the first multi-head attention vector:

$$s^a=\text{MHA}(e_s,\bar{e}_T)$$

After $e_s$ and $\bar{e}_T$ are subject to the processing of the MHA layer, the obtained multi-head attention vector representation of the sentence to the target word may be represented by $s^a=[s_1^a; s_2^a; \ldots; s_m^a]$. Specifically, a first similarity between the word vector corresponding to the sentence and the reference word vector corresponding to the target word is calculated. The first similarity is input into the softmax function, and the summation operation is performed on outputs of the softmax function to obtain a first attention value. A parallel calculation is performed on the first attention value with the multi-headed attention function to obtain the first multi-head attention vector.

Similarly, the word vector corresponding to the target word and the reference word vector corresponding to the sentence word may be input into the MHA function, i.e., $e_T$ and $\bar{e}_S$ may be input the function $\text{MHA}(k,q)=(\text{head}_1; \text{head}_2; \ldots; \text{head}_h)\cdot W_o$, thereby outputting the second multi-head attention vector:

$$t^b=\text{MHA}(e_T,\bar{e}_S)$$

After $e_T$ and $\bar{e}_S$ are subject to the processing of the MHA layer, the obtained multi-head attention vector representation of the target word to the sentence may be represented by $t^b=[t_i^b; t_{i+1}^b; \ldots; t_{i+n-1}^b]$. Specifically, a second similarity between the word vector corresponding to the target word and the reference word vector corresponding to the sentence is calculated. The second similarity is input into the softmax function, and the summation operation is performed on outputs of the softmax function to obtain a second attention value. A parallel calculation is performed on the second attention value with the multi-headed attention function to obtain the second multi-head attention vector.

In an implementation, the above steps may be achieved by the following code:

```
context_out, _ = self.attention(context, target_mean)
context_out = self.conv(context_out)
context_out = context_out.squeeze(dim=1)
target_out, _ = self.attention(target, context_mean)
target_out = self.conv(target_out)
target_out = target_out.squeeze(dim=1
```

Optionally, the step S120 may be achieved by the following code:

```
Self.attention=Attention(opt.bert_dim, out_dim=opth.hidden_dim, n_head=8,
score_function='mlp', dropout=opt.dropout)
```

Figure 3:
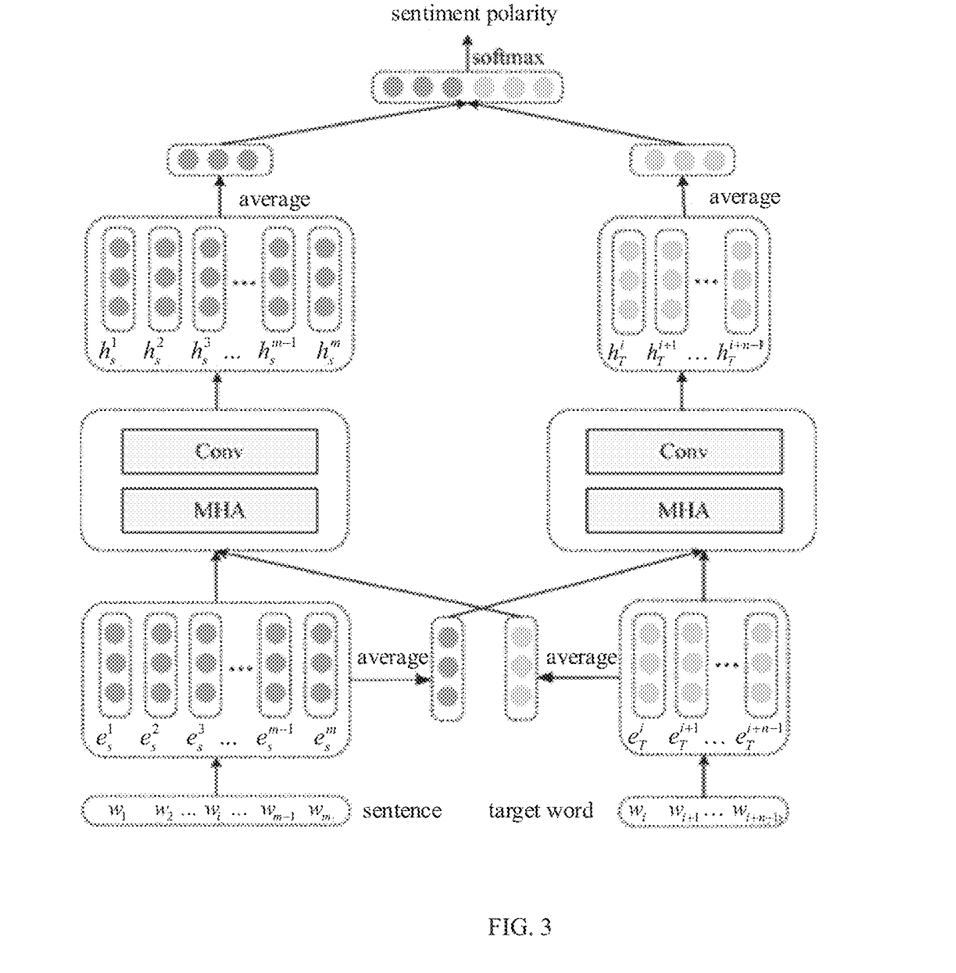
FIG. 3 is a schematic diagram illustrating a process of performing aspect-level text sentiment classification on sentences using a target neural network according to an embodiment of the present disclosure.

Referring to FIG. 3, a diagram of the processing of performing aspect-level text sentiment classification on sentences by a target neural network according to an embodiment of the present disclosure. In FIG. 3, after the sentence and the target word are acquired, the sentence and the target word may be input into a BERT model, thereby acquiring word vectors respectively corresponding to the sentence and the target word. Furthermore, an average operation is performed on each of the word vectors respectively corresponding to the sentence and the target word, thereby obtaining the reference word vectors respectively corresponding to the sentence and the target word.

Furthermore, the word vectors respectively corresponding to the sentence and the target word as well as the reference word vectors respectively corresponding to the sentence and the target word are input into a MHA layer of a target neural network, and outputs of the MHA layer are input into a convolution layer. An average operation is performed on outputs of the convolution layer, and results of the average operation are analyzed by a softmax function, thereby obtaining a sentiment polarity of the sentence.

In step S130, based on the first multi-head attention vector, a first hidden semantic representation corresponding to the sentence is acquired; and based on the second multi-head attention vector, a second hidden semantic representation corresponding to the target word is acquired.

In an implementation, the target neural network may further include a convolution layer. In this case, the first multi-head attention vector may be input into a convolution layer, thereby obtaining a first hidden state; and the second multi-head attention vector may be input into a convolution layer, thereby obtaining a second hidden state. Then, an average operation is performed on the first hidden state, thereby obtaining the first hidden semantic representation corresponding to the sentence. An average operation is performed on the second hidden state, thereby obtaining the second hidden semantic representation corresponding to the target word.

In an implementation, the calculation applied by the convolution layer is performed according to a formula as follows:

$$\text{Conv}(h) = \text{ELU}(h * W^1 + b^1) * W^2 + b^2$$

where $W^1$ and $W^2$ represent weight matrixes, $b^1$ and $b^2$ represent bias, and $*$ represents a convolution operation.

In an implementation, the first multi-head attention vector and the second multi-head attention vector may be input into a convolutional layer, thereby obtaining hidden states. The hidden states may be understood as attention information co-encoded by the sentence and the target word, and are represented by $h_S = [h_S^1; h_S^2; \ldots; h_S^m]$, $h_T = [h_T^i; H_T^{i+1}; \ldots; h_T^{i+n-1}]$, where $$h_s = \text{Conv}(s^a).$$

In an implementation, by performing an average operation on each of $h_S$ and $h_T$, the first hidden semantic representation corresponding to the sentence and the second hidden semantic representation corresponding to the target word are obtained, where the first hidden semantic representation $\bar{h}_s$, and the second hidden semantic representation $\bar{h}_T$ are as follows.

$$\bar{h}_s = \sum_{i=1}^{m} \frac{h_S^i}{m}$$

$$\bar{h}_T = \sum_{i=1}^{n} \frac{H_T^i}{n}$$

In step S140, a classification feature vector is acquired, based on the first and second hidden semantic representations.

In an implementation, the first hidden semantic representation and the second hidden semantic representation may be concatenated based on a pre-setting rule, thereby obtaining a classification feature vector. The pre-setting rule may be as follows:

$$\gamma = [\bar{h}_s; \bar{h}_T]$$

where $\gamma$ represents the classification feature vector.

In step S150, based on the classification feature vector, a sentiment polarity category of the sentence is acquired, thereby a sentiment classification is performed on the sentence.

In an implementation, a linear feature transformation may be performed on the classification feature vector. The result of the linear transformation may be projected into a specified space. A number of predict probabilities respectively corresponding to a number of sentiment polarity categories for the sentence are acquired in the specified space. One of the number of sentiment polarity categories corresponding to the highest predict probability is taken as the sentiment polarity category of the sentence.

In an implementation, the linear feature transformation may be performed on the classification feature vector by using a formula $x = W_l \cdot \gamma + b_l$. The predict probabilities respectively corresponding to the number of sentiment polarity categories for the sentence in the specified space may be acquired by using a formula $$P_c = \frac{\exp(x_c)}{\sum_{i \in C} \exp(x_i)}.$$

In the formulas, $W_l$ represents a weight matrix, $b_l$ represents a bias, C represents a class of multiple sentiment polarity categories, and $P_c$ represents a predict probability of the sentiment polarity of a category $c \in C$. In an implementation, the sentiment polarity category corresponding to the highest probability is taken as the final predict sentiment polarity category.

In an implementation, the sentiment polarity categories may include "positive", "negative", and "neutral". In some implementations, a sentiment polarity category of "positive" may further include subdivided sentiment categories, such as happy, excited, or grateful. Similarly, a sentiment polarity category of "negative" may further include pain, hate, or jealousy. The sentiment polarity categories are not limited in the disclosure.

In the data processing method provided by the embodiments of the present disclosure, pending word vectors are acquired. Then, multi-head attention vectors are acquired based on the pending word vectors, where the multi-head attention vectors include a first multi-head attention vector and a second multi-head attention vector, the first multi-head attention vector represents a multi-head attention vector representation of the sentence to the target word, and the second multi-head attention vector represents a multi-head attention vector representation of the target word to the sentence. Based on the first multi-head attention vector, a first hidden semantic representation corresponding to the sentence is acquired. Based on the second multi-head attention vector, a second hidden semantic representation corresponding to the target word is acquired. Then, a classification feature vector is acquired, based on the first and second hidden semantic representations. Afterwards, a sentiment polarity category of the sentence is acquired based on the classification feature vector, and a sentiment classification is performed on the sentence. By means of the above-mentioned means, the multi-head attention vectors are acquired based on the pending word vectors, thereby acquiring vector representations corresponding to the sentence and the target word, which vector representations incorporate semantic information of the sentence. Thus, the classification result based on the classification feature vector can be more accurate, and the accuracy of the sentiment classification can be improved.

Figure 4:
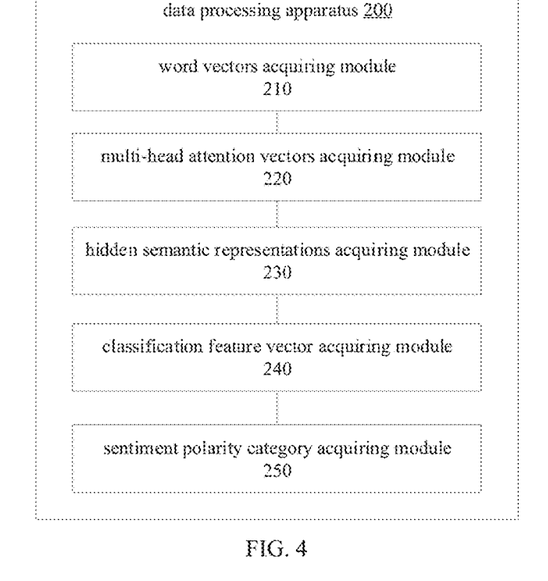
FIG. 4 is a schematic structural diagram of a data processing apparatus according to an embodiment of the present disclosure.

Referring to FIG. 4, a schematic structural diagram of a data processing apparatus according to an embodiment of the present disclosure is illustrated. The embodiment of the present disclosure provides a data processing apparatus 200, which may be applied in an electronic device. The device 200 may include: a word vectors acquiring module 210, a multi-head attention vectors acquiring module 220, a hidden semantic representations acquiring module 230, a classification feature vector acquiring module 240, and a sentiment polarity category acquiring module 250.

The word vectors acquiring module 210 is configured to acquire pending word vectors. The pending word vectors include word vectors and reference word vectors. The word vectors respectively correspond to a sentence and a target word, and the reference word vectors respectively correspond to the sentence and the target word.

In an implementation, the word vectors acquiring module 210 is specifically configured to acquire the sentence and the target word included in the sentence; input the sentence and the target word into a BERT model, and acquire outputs of the BERT model as vector representations, where the BERT model is obtained by pre-training, the vector representations respectively correspond to the sentence and the target word, and the vector representations incorporate semantic information of the sentence; perform an average operation on each of the vector representations, thereby obtaining the pending word vectors.

The multi-head attention vectors acquiring module 220 is configured to acquire multi-head attention vectors based on the pending word vectors. The multi-head attention vectors include a first multi-head attention vector and a second multi-head attention vector. The first multi-head attention vector represents a multi-head attention vector representation of the sentence to the target word, and the second multi-head attention vector represents a multi-head attention vector representation of the target word to the sentence.

In an implementation, the multi-head attention vectors acquiring module 220 is configured to input the pending word vectors into a multi-headed attention layer of a target neural network, and taking outputs of the multi-headed attention layer as the multi-head attention vectors. The word vector corresponding to the sentence and the reference word vector corresponding to the target word may be input into a multi-headed attention function, to obtain the first multi-head attention vector. The word vector corresponding to the target word and the reference word vector corresponding to the sentence may be input into the multi-headed attention function, to obtain the second multi-head attention vector.

The hidden semantic representations acquiring module 230 is configured to: acquire, based on the first multi-head attention vector, a first hidden semantic representation corresponding to the sentence; and acquire, based on the second multi-head attention vector, a second hidden semantic representation corresponding to the target word.

In an implementation, the target neural network further includes a convolution layer. In this case, the hidden semantic representations acquiring module 230 is specifically configured to input the first multi-head attention vector into the convolution layer, thereby obtaining a first hidden state; input the second multi-head attention vector into the convolution layer, thereby obtaining a second hidden state; perform an average operation on the first hidden state, thereby obtaining the first hidden semantic representation corresponding to the sentence; and perform an average operation on the second hidden state, thereby obtaining the second hidden semantic representation corresponding to the target word.

The classification feature vector acquiring module 240 is configured to acquire a classification feature vector, based on the first and second hidden semantic representations.

In an implementation, the classification feature vector acquiring module 240 is configured to concatenate the first hidden semantic representation and the second hidden semantic representation based on a pre-setting rule, thereby obtaining the classification feature vector.

The sentiment polarity category acquiring module 250 is configured to acquire, based on the classification feature vector, a sentiment polarity category of the sentence and perform a sentiment classification on the sentence.

In an implementation, the sentiment polarity category acquiring module 250 is configured to perform a linear feature transformation on the classification feature vector, project the result of the linear transformation into a specified space, and acquire a plurality of predict probabilities respectively corresponding to a plurality of sentiment polarity categories for the sentence in the specified space; and take one of the plurality of sentiment polarity categories corresponding to the highest predict probability as the sentiment polarity category of the sentence.

In the data processing apparatus provided by the embodiments of the present disclosure, pending word vectors are acquired. Then, multi-head attention vectors are acquired based on the pending word vectors, where the multi-head attention vectors include a first multi-head attention vector and a second multi-head attention vector, the first multi-head attention vector represents a multi-head attention vector representation of the sentence to the target word, and the second multi-head attention vector represents a multi-head attention vector representation of the target word to the sentence. Based on the first multi-head attention vector, a first hidden semantic representation corresponding to the sentence is acquired. Based on the second multi-head attention vector, a second hidden semantic representation corresponding to the target word is acquired. Then, a classification feature vector is acquired, based on the first and second hidden semantic representations. Afterwards, a sentiment polarity category of the sentence is acquired based on the classification feature vector, and a sentiment classification is performed on the sentence. By means of the above-mentioned means, the multi-head attention vectors are acquired based on the pending word vectors, thereby acquiring vector representations corresponding to the sentence and the target word, which vector representations incorporate semantic information of the sentence. Thus, the classification result based on the classification feature vector can be more accurate, and the accuracy of the sentiment classification can be improved.

It should be clear for those skilled in the art that, the description of specific working processes of the apparatus and the modules can be referred to the corresponding processes in the method embodiments, which will not repeated here again, for simple and concise description.

In the embodiments of the present disclosure, the coupling, including direct coupling or communication connection, between the modules shown or discussed may be indirect coupling or communication connection by means of some interfaces, devices or modules, which may be electrical, mechanical or other forms.

In addition, the functional modules in the embodiments of the disclosure may be integrated into one processing module, or each of the modules may exist alone physically, or two or more modules may be integrated into one module. The integrated module may be implemented in hardware or software functional modules.

Figure 5:
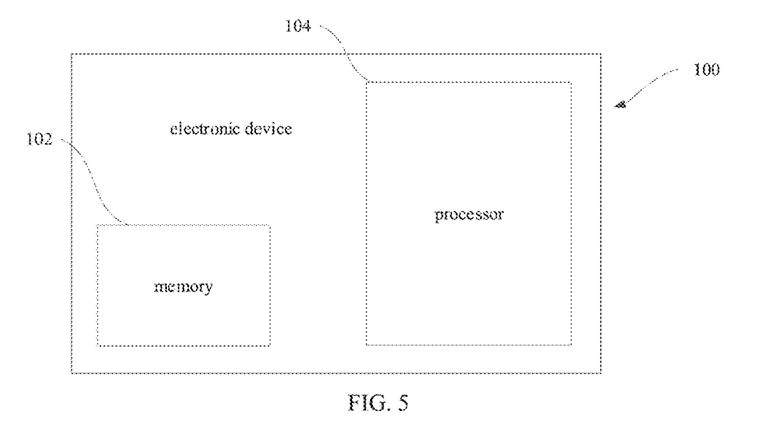
FIG. 5 is a schematic structural diagram of an electronic device according to another embodiment of the present disclosure.

Referring to FIG. 5, based on the data processing method and apparatus, an embodiment of the disclosure provides an electronic device 100, which can implement the data processing method. The electronic device 100 includes a memory 102 and one or more (only one is shown in FIG. 5) processors 104 coupled to each other. The memory 102 and the processors 104 are connected by communication lines. The memory 102 stores one or more programs which can be executed to implement the data processing method mentioned above. The processors 104 can execute the programs stored in the memory 102.

The processor 104 may include one or more processing cores. The processor 104 connects various parts of the electronic device 100 by means of a number of interfaces and lines. The processor 104 perform performs various function and process data by running or executing instructions, programs, code sets, or instruction sets stored in the memory 102 and calling data stored in the memory 102. In an implementation, the processor 104 may be embodied as at least one of a digital signal processing (DSP), a field-programmable gate array (FPGA), and a programmable logic array (PLA). The processor 104 may integrate a Central Processing Unit (CPU), a Graphics Processing Unit (GPU), a modem, or a combination thereof. The CPU is mainly used to handle the operating system, user interface, applications, etc.; the GPU is used to render and draw the displayed content; and the modem is used to process wireless communication. It is understandable that the modem can also be implemented by a communication chip without being integrated into the processor 104.

The memory 102 may include a Random Access Memory (RAM) or a Read-Only Memory (ROM). The memory 102 may be used to store the instructions, programs, code, code sets, or instruction sets. The memory 102 includes a program storage area and a data storage area. The program storage area stores instructions for implementing the operating system, instructions for implementing at least one function (such as a touch function, a sound playback function, and an image display function), instructions for implementing the embodiments, etc. The data storage area may store data (e.g., a phone book, audio and video data, and chat log data) created during the usage of the electronic device 100.

When being executed by the one or more processors, the one or more programs cause the one or more processors to perform the following steps: acquiring pending word vectors, based on a sentence including a target word; acquiring multi-head attention vectors, based on the pending word vectors; acquiring hidden semantic representations, based on the multi-head attention vectors; acquiring a classification feature vector, based on the hidden semantic representations; and acquiring, based on the classification feature vector, a sentiment polarity category of the sentence, thereby performing a sentiment classification on the sentence.

In an implementation, the acquiring pending word vectors, based on a sentence including a target word, includes: acquiring the sentence and the target word included in the sentence; inputting the sentence and the target word into a BERT model, and acquiring outputs of the BERT model as word vectors respectively correspond to the sentence and the target word, where the word vectors incorporate semantic information of the sentence; and performing an average operation on each of the word vectors to obtain the reference word vectors respectively correspond to the sentence and the target word, thereby obtaining the pending word vectors comprising the word vectors and the reference word vectors.

In an implementation, the acquiring, based on the pending word vectors, multi-head attention vectors, includes: inputting the pending word vectors into a multi-headed attention layer of a target neural network, and taking outputs of the multi-headed attention layer as the multi-head attention vectors, where the multi-head attention vectors include a first multi-head attention vector and a second multi-head attention vector, the first multi-head attention vector represents a multi-head attention vector representation of the sentence to the target word, and the second multi-head attention vector represents a multi-head attention vector representation of the target word to the sentence.

In an implementation, the inputting the pending word vectors into a multi-headed attention layer of a target neural network, and taking outputs of the multi-headed attention layer as the multi-head attention vectors, includes: inputting the word vector corresponding to the sentence and the reference word vector corresponding to the target word into a multi-headed attention function, and outputting the first multi-head attention vector; and inputting the word vector corresponding to the target word and the reference word vector corresponding to the sentence into the multi-headed attention function, and outputting the second multi-head attention vector.

In an implementation, the target neural network further includes a convolution layer, and the acquiring, based on the multi-head attention vectors, hidden semantic representations, includes: inputting the first multi-head attention vector into the convolution layer, thereby obtaining a first hidden state; inputting the second multi-head attention vector into the convolution layer, thereby obtaining a second hidden state; performing an average operation on the first hidden state, thereby obtaining a first hidden semantic representation corresponding to the sentence; and performing an average operation on the second hidden state, thereby obtaining a second hidden semantic representation corresponding to the target word.

In an implementation, the acquiring a classification feature vector, based on the first and the second hidden semantic representations, includes: concatenating the first hidden semantic representation and the second hidden semantic representation based on a pre-setting rule, thereby obtaining the classification feature vector.

In an implementation, the acquiring, based on the classification feature vector, a sentiment polarity category of the sentence, includes: performing a linear feature transformation on the classification feature vector, projecting the result of the linear transformation into a specified space, and acquiring a plurality of predict probabilities respectively corresponding to a plurality of sentiment polarity categories for the sentence in the specified space; and taking one of the plurality of sentiment polarity categories corresponding to the highest predict probability as the sentiment polarity category of the sentence.

The implementations of the above steps are substantially the same as those mentioned above, and details thereof are not repeated here again.

Figure 6:
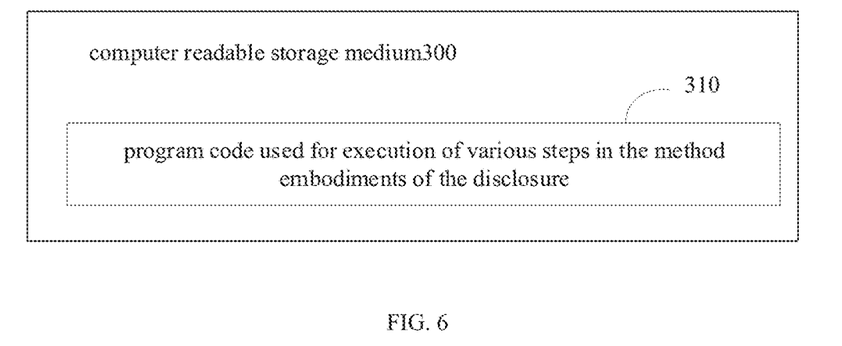
FIG. 6 is a schematic structural diagram of a storage unit for storing or carrying the program codes for implementing the data processing method according to an embodiment of the present disclosure.

Referring to FIG. 6, a schematic structural diagram of a computer readable storage medium 300 according to an embodiment of the present disclosure is illustrated. The computer readable storage medium 300 stores program codes therein. The program codes, when being executed by a processor, cause the processor to implement steps including: acquiring pending word vectors, based on a sentence including a target word; acquiring, based on the pending word vectors, multi-head attention vectors respectively correspond to the sentence and the target word; acquiring, based on the multi-head attention vectors, hidden semantic representations respectively correspond to the sentence and the target word; acquiring a classification feature vector, based on the hidden semantic representations; and acquiring, based on the classification feature vector, a sentiment polarity category of the sentence, thereby performing a sentiment classification on the sentence.

In an implementation, the acquiring pending word vectors, based on a sentence including a target word, includes: acquiring the sentence and the target word included in the sentence; inputting the sentence and the target word into a BERT model, and acquiring outputs of the BERT model as word vectors respectively correspond to the sentence and the target word, where the word vectors incorporate semantic information of the sentence; and performing an average operation on each of the word vectors to obtain the reference word vectors respectively correspond to the sentence and the target word, thereby obtaining the pending word vectors comprising the word vectors and the reference word vectors.

In an implementation, the acquiring, based on the pending word vectors, multi-head attention vectors respectively correspond to the sentence and the target word, includes: inputting the word vector corresponding to the sentence and the reference word vector corresponding to the target word into a multi-headed attention layer of a target neural network, and outputting a first multi-head attention vector, where the first multi-head attention vector represents a multi-head attention vector representation of the sentence to the target word; inputting the word vector corresponding to the target word and the reference word vector corresponding to the sentence into a multi-headed attention layer of the target neural network, and outputting a second multi-head attention vector, where the second multi-head attention vector represents a multi-head attention vector representation of the target word to the sentence.

In an implementation, the target neural network further includes a convolution layer, and the acquiring, based on the multi-head attention vectors, hidden semantic representations, includes: inputting the first multi-head attention vector into the convolution layer, thereby obtaining a first hidden state; inputting the second multi-head attention vector into the convolution layer, thereby obtaining a second hidden state; performing an average operation on the first hidden state, thereby obtaining a first hidden semantic representation corresponding to the sentence; performing an average operation on the second hidden state, thereby obtaining a second hidden semantic representation corresponding to the target word.

In an implementation, the acquiring a classification feature vector, based on the hidden semantic representations, includes: concatenating the first hidden semantic representation and the second hidden semantic representation based on a pre-setting rule, thereby obtaining the classification feature vector.

The implementations of the above steps are substantially the same as those mentioned above, and details thereof are not repeated here again.

The computer readable storage medium 300 may be an electronic memory, such as a flash memory, an electrically erasable programmable read-only memory (EEPROM), an erasable programmable read only memory (EPROM), a hard disk, or ROM. In an implementation, the computer readable storage medium 300 may include a non-transitory computer-readable storage medium. The computer readable storage medium 300 has a storage space for the program code 310 used for execution of any steps in the method embodiments. The program code may be read form or written into one or more computer program products. The program code 310 may be compressed, for example, in an appropriate form.

In the description of the disclosure, the description with reference to the terms "an embodiment", "some embodiments", "example", "specific example", or "some examples" and the like, means that specific features, structures, materials, or characteristics described in connection with such embodiment or example are included in at least one embodiment or example of the disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, those skilled in the art can combine the various embodiments or examples described in the specification or the features thereof in the case of no confliction.

In conclusion, in the data processing method and apparatus, the electronic device and the storage medium provided by the embodiments of the present disclosure, pending word vectors are acquired. Then, multi-head attention vectors are acquired based on the pending word vectors, where the multi-head attention vectors include a first multi-head attention vector and a second multi-head attention vector, the first multi-head attention vector represents a multi-head attention vector representation of the sentence to the target word, and the second multi-head attention vector represents a multi-head attention vector representation of the target word to the sentence. Based on the first multi-head attention vector, a first hidden semantic representation corresponding to the sentence is acquired. Based on the second multi-head attention vector, a second hidden semantic representation corresponding to the target word is acquired. Then, a classification feature vector is acquired, based on the first and the second hidden semantic representations. Afterwards, a sentiment polarity category of the sentence is acquired based on the classification feature vector, and a sentiment classification is performed on the sentence. By the above-mentioned means, the multi-head attention vectors are acquired based on the pending word vectors, thereby acquiring vector representations corresponding to the sentence and the target word, which vector representations incorporate semantic information of the sentence. Thus, the classification result based on the classification feature vector can be more accurate, furthermore the accuracy of the sentiment classification can be improved.

Finally, it should be noted that the above embodiments are only used to illustrate the technical solutions of the present disclosure, but are not to limit the disclosure. Although the above embodiments of the present disclosure have been described in detail, it will be understood by those skilled in the art that modifications to the technical solutions of the above embodiments, and equivalent substitutions to some technical features may also made without departing from the sprit and the scope of the technical solutions of the above embodiments in the disclosure.

What is claimed is:

1. A data processing method, comprising:
acquiring pending word vectors, wherein the pending word vectors comprise word vectors and reference word vectors, the word vectors respectively correspond to a sentence and a target word, and the reference word vectors respectively correspond to the sentence and the target word;
acquiring multi-head attention vectors based on the pending word vectors, wherein the multi-head attention vectors comprise a first multi-head attention vector and a second multi-head attention vector, the first multi-head attention vector represents a multi-head attention vector representation of the sentence to the target word, and the second multi-head attention vector represents a multi-head attention vector representation of the target word to the sentence;
acquiring, based on the first multi-head attention vector, a first hidden semantic representation corresponding to the sentence, and acquiring, based on the second multi-head attention vector, a second hidden semantic representation corresponding to the target word;
acquiring a classification feature vector, based on the first and the second hidden semantic representations; and
acquiring, based on the classification feature vector, a sentiment polarity category of the sentence, thereby performing a sentiment classification on the sentence.

2. The method as claimed in claim 1, wherein the acquiring pending word vectors, comprises:
acquiring the sentence and the target word included in the sentence;
inputting the sentence and the target word into a bidirectional encoder representations from transformers (BERT) model, and acquiring outputs of the BERT model as vector representations, wherein the BERT model is obtained by pre-training, the vector representations respectively correspond to the sentence and the target word, and the vector representations incorporate semantic information of the sentence, and the vector representations are taken as the word vectors respectively correspond to the sentence and the target word; and
performing an average operation on each of the vector representations to obtain the reference word vectors respectively correspond to the sentence and the target word, thereby obtaining the pending word vectors.

3. The method as claimed in claim 1, wherein the acquiring multi-head attention vectors based on the pending word vectors, comprises:
inputting the pending word vectors into a multi-headed attention layer of a target neural network, and taking outputs of the multi-headed attention layer as the multi-head attention vectors.

4. The method as claimed in claim 3, wherein the inputting the pending word vectors into a multi-headed attention layer of a target neural network, and taking outputs of the multi-headed attention layer as the multi-head attention vectors, comprises:
inputting the word vector corresponding to the sentence and the reference word vector corresponding to the target word into a multi-headed attention function, and outputting the first multi-head attention vector; and
inputting the word vector corresponding to the target word and the reference word vector corresponding to the sentence into the multi-headed attention function, and outputting the second multi-head attention vector.

5. The method as claimed in claim 4, wherein the inputting the word vector corresponding to the sentence and the reference word vector corresponding to the target word into a multi-headed attention function, and outputting the first multi-head attention vector, comprise:
calculating a first similarity between the word vector corresponding to the sentence and the reference word vector corresponding to the target word;
inputting the first similarity into a softmax function, and performing a summation operation on outputs of the softmax function, thereby obtaining a first attention value; and
performing a parallel calculation on the first attention value with the multi-headed attention function, thereby outputting the first multi-head attention vector; and
wherein the inputting the word vector corresponding to the target word and the reference word vector corresponding to the sentence into the multi-headed attention function, and outputting the second multi-head attention vector, comprise:
calculating a second similarity between the word vector corresponding to the target word and the reference word vector corresponding to the sentence;
inputting the second similarity into the softmax function, and performing a summation operation on outputs of the softmax function, thereby obtaining a second attention value; and
performing a parallel calculation on the second attention value with the multi-headed attention function, thereby outputting the second multi-head attention vector.

6. The method as claimed in claim 4, wherein the target neural network further comprises a convolution layer, and the acquiring, based on the first multi-head attention vector, a first hidden semantic representation corresponding to the sentence, and acquiring, based on the second multi-head attention vector, a second hidden semantic representation corresponding to the target word, comprises:
inputting the first multi-head attention vector into the convolution layer, thereby obtaining a first hidden state;
inputting the second multi-head attention vector into the convolution layer, thereby obtaining a second hidden state;
performing an average operation on the first hidden state, thereby obtaining the first hidden semantic representation corresponding to the sentence; and performing an average operation on the second hidden state, thereby obtaining the second hidden semantic representation corresponding to the target word.

7. The method as claimed in claim 5, wherein the acquiring a classification feature vector, based on the first and the second hidden semantic representations, comprises:

concatenating the first hidden semantic representation and the second hidden semantic representation based on a pre-setting rule, thereby obtaining the classification feature vector.

8. The method as claimed in claim 1, wherein the acquiring, based on the classification feature vector, a sentiment polarity category of the sentence, comprises:

performing a linear feature transformation on the classification feature vector, projecting the result of the linear transformation into a specified space, and acquiring a plurality of predict probabilities respectively corresponding to a plurality of sentiment polarity categories for the sentence in the specified space; and taking one of the plurality of sentiment polarity categories corresponding to the highest predict probability as the sentiment polarity category of the sentence.

9. An electronic device, comprising a memory and one or more processors, wherein one or more programs are stored in the memory and when being executed by the one or more processors, cause the one or more processors to perform steps comprising:

acquiring pending word vectors, based on a sentence including a target word;

acquiring multi-head attention vectors, based on the pending word vectors;

acquiring hidden semantic representations, based on the multi-head attention vectors;

acquiring a classification feature vector, based on the hidden semantic representations; and acquiring, based on the classification feature vector, a sentiment polarity category of the sentence, thereby performing a sentiment classification on the sentence.

10. The electronic device as claimed in claim 9, wherein the acquiring pending word vectors, based on a sentence including a target word, comprises:

acquiring the sentence and the target word included in the sentence;

inputting the sentence and the target word into a BERT model, and acquiring outputs of the BERT model as word vectors respectively correspond to the sentence and the target word, wherein the word vectors incorporate semantic information of the sentence; and performing an average operation on each of the word vectors to obtain the reference word vectors respectively correspond to the sentence and the target word, thereby obtaining the pending word vectors comprising the word vectors and the reference word vectors.

11. The electronic device as claimed in claim 10, wherein the acquiring multi-head attention vectors based on the pending word vectors, comprises:

inputting the pending word vectors into a multi-headed attention layer of a target neural network, and taking outputs of the multi-headed attention layer as the multi-head attention vectors, wherein the multi-head attention vectors comprise a first multi-head attention vector and a second multi-head attention vector, the first multi-head attention vector represents a multi-head attention vector representation of the sentence to the target word, and the second multi-head attention vector represents a multi-head attention vector representation of the target word to the sentence.

12. The electronic device as claimed in claim 11, wherein the inputting the pending word vectors into a multi-headed attention layer of a target neural network, and taking outputs of the multi-headed attention layer as the multi-head attention vectors, comprises:

inputting the word vector corresponding to the sentence and the reference word vector corresponding to the target word into a multi-headed attention function, and outputting the first multi-head attention vector; and inputting the word vector corresponding to the target word and the reference word vector corresponding to the sentence into the multi-headed attention function, and outputting the second multi-head attention vector.

13. The electronic device as claimed in claim 12, wherein the target neural network further comprises a convolution layer, and the acquiring hidden semantic representations, based on the multi-head attention vectors, comprises:

inputting the first multi-head attention vector into the convolution layer, thereby obtaining a first hidden state;

inputting the second multi-head attention vector into the convolution layer, thereby obtaining a second hidden state;

performing an average operation on the first hidden state, thereby obtaining a first hidden semantic representation corresponding to the sentence; and performing an average operation on the second hidden state, thereby obtaining a second hidden semantic representation corresponding to the target word.

14. The electronic device as claimed in claim 13, wherein the acquiring a classification feature vector, based on the hidden semantic representations, comprises:

concatenating the first hidden semantic representation and the second hidden semantic representation based on a pre-setting rule, thereby obtaining the classification feature vector.

15. The electronic device as claimed in claim 9, wherein the acquiring, based on the classification feature vector, a sentiment polarity category of the sentence, comprises:

performing a linear feature transformation on the classification feature vector, projecting the result of the linear transformation into a specified space, and acquiring a plurality of predict probabilities respectively corresponding to a plurality of sentiment polarity categories for the sentence in the specified space; and taking one of the plurality of sentiment polarity categories corresponding to the highest predict probability as the sentiment polarity category of the sentence.

16. A non-transitory computer readable storage medium, wherein the computer readable storage medium stores program codes therein, the program codes when being executed by a processor, cause the processor to implement steps including:

acquiring pending word vectors, based on a sentence including a target word;

acquiring, based on the pending word vectors, multi-head attention vectors respectively correspond to the sentence and the target word;

acquiring, based on the multi-head attention vectors, hidden semantic representations respectively correspond to the sentence and the target word;

acquiring a classification feature vector, based on the hidden semantic representations; and acquiring, based on the classification feature vector, a sentiment polarity category of the sentence, thereby performing a sentiment classification on the sentence.

17. The non-transitory computer readable storage medium as claimed in claim 16, wherein the acquiring pending word vectors based on a sentence including a target word, comprises:
    acquiring the sentence and the target word included in the sentence;
    inputting the sentence and the target word into a BERT model, and acquiring outputs of the BERT model as word vectors respectively correspond to the sentence and the target word, wherein the word vectors incorporate semantic information of the sentence; and
    performing an average operation on each of the word vectors to obtain the reference word vectors respectively correspond to the sentence and the target word, thereby obtaining the pending word vectors comprising the word vectors and the reference word vectors.

18. The non-transitory computer readable storage medium as claimed in claim 17, wherein the acquiring, based on the pending word vectors, multi-head attention vectors respectively correspond to the sentence and the target word, comprises:
    inputting the word vector corresponding to the sentence and the reference word vector corresponding to the target word into a multi-headed attention layer of a target neural network, and outputting a first multi-head attention vector, wherein the first multi-head attention vector represents a multi-head attention vector representation of the sentence to the target word;
    inputting the word vector corresponding to the target word and the reference word vector corresponding to the sentence into a multi-headed attention layer of the target neural network, and outputting a second multi-head attention vector, wherein the second multi-head attention vector represents a multi-head attention vector representation of the target word to the sentence.

19. The non-transitory computer readable storage medium as claimed in claim 18, wherein the target neural network further comprises a convolution layer, and the acquiring, based on the multi-head attention vectors, hidden semantic representations, comprises:
    inputting the first multi-head attention vector into the convolution layer, thereby obtaining a first hidden state;
    inputting the second multi-head attention vector into the convolution layer, thereby obtaining a second hidden state;
    performing an average operation on the first hidden state, thereby obtaining a first hidden semantic representation corresponding to the sentence;
    performing an average operation on the second hidden state, thereby obtaining a second hidden semantic representation corresponding to the target word.

20. The non-transitory computer readable storage medium as claimed in claim 19, wherein the acquiring a classification feature vector, based on the hidden semantic representations, comprises:
    concatenating the first hidden semantic representation and the second hidden semantic representation based on a pre-setting rule, thereby obtaining the classification feature vector.

* * * * *